(12) United States Patent
Lambert et al.

(10) Patent No.: US 10,990,545 B1
(45) Date of Patent: Apr. 27, 2021

(54) SYSTEM AND METHOD FOR HANDLING IN-BAND INTERRUPTS WITH MULTIPLE I3C MASTERS

(71) Applicant: DELL PRODUCTS, LP, Round Rock, TX (US)

(72) Inventors: Timothy M. Lambert, Austin, TX (US); Jordan Chin, Austin, TX (US); Nihit S. Bhavsar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/836,620

(22) Filed: Mar. 31, 2020

(51) Int. Cl.
*G06F 13/24* (2006.01)
*G06F 13/42* (2006.01)

(52) U.S. Cl.
CPC .......... *G06F 13/24* (2013.01); *G06F 13/4282* (2013.01); *G06F 2213/0016* (2013.01)

(58) Field of Classification Search
CPC ................. G06F 13/24; G06F 13/4282; G06F 2213/0016
USPC ........................................................ 710/105
See application file for complete search history.

(56) References Cited

U.S. PATENT DOCUMENTS

| 10,769,084 | B2* | 9/2020 | Foust ................. G06F 13/4282 |
| 2008/0307148 | A1 | 12/2008 | Naderi et al. |
| 2008/0307154 | A1 | 12/2008 | Naderi et al. |
| 2019/0108149 | A1* | 4/2019 | Graif .................... G06F 13/364 |
| 2020/0065274 | A1* | 2/2020 | Graif .................. G06F 13/4282 |

* cited by examiner

*Primary Examiner* — Brian T Misiura
(74) *Attorney, Agent, or Firm* — Larson Newman, LLP

(57) ABSTRACT

A multiplexor for an I3C) network includes a switch, a routing map, and an interrupt detector. The switch selectably couples I3C slave interfaces to I3C master interfaces. The routing map includes map entries associating each I3C slave interface with an I3C master interfaces based upon an I3C address of the I3C slave interface, such that, for each map entry, an IBI received from the associated I3C slave interface is mapped to the associated I3C master interface. The interrupt detector detects an IBI from an I3C slave interface, determines that a map entry associated with the I3C slave interface maps the I3C slave interface with a particular I3C master interface based upon the IBI, and directs the switch to couple the I3C slave interface to the I3C master interface based upon the map entry.

20 Claims, 3 Drawing Sheets

SYSTEM AND METHOD FOR HANDLING IN-BAND INTERRUPTS WITH MULTIPLE I3C MASTERS

FIELD OF THE DISCLOSURE

This disclosure generally relates to information handling systems, and more particularly relates to handling in-band interrupts with multiple I3C master interfaces in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A multiplexor for an I3C network may include a switch, a routing map, and an interrupt detector. The switch may selectably couple I3C slave interfaces to I3C master interfaces. The routing map may include map entries associating each I3C slave interface with an I3C master interfaces based upon an I3C address of the I3C slave interface, such that, for each map entry, an IBI received from the associated I3C slave interface may be mapped to the associated I3C master interface. The interrupt detector may detect an IBI from an I3C slave interface, determine that a map entry associated with the I3C slave interface maps the I3C slave interface with a particular I3C master interface based upon the IBI, and direct the switch to couple the I3C slave interface to the I3C master interface based upon the map entry.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
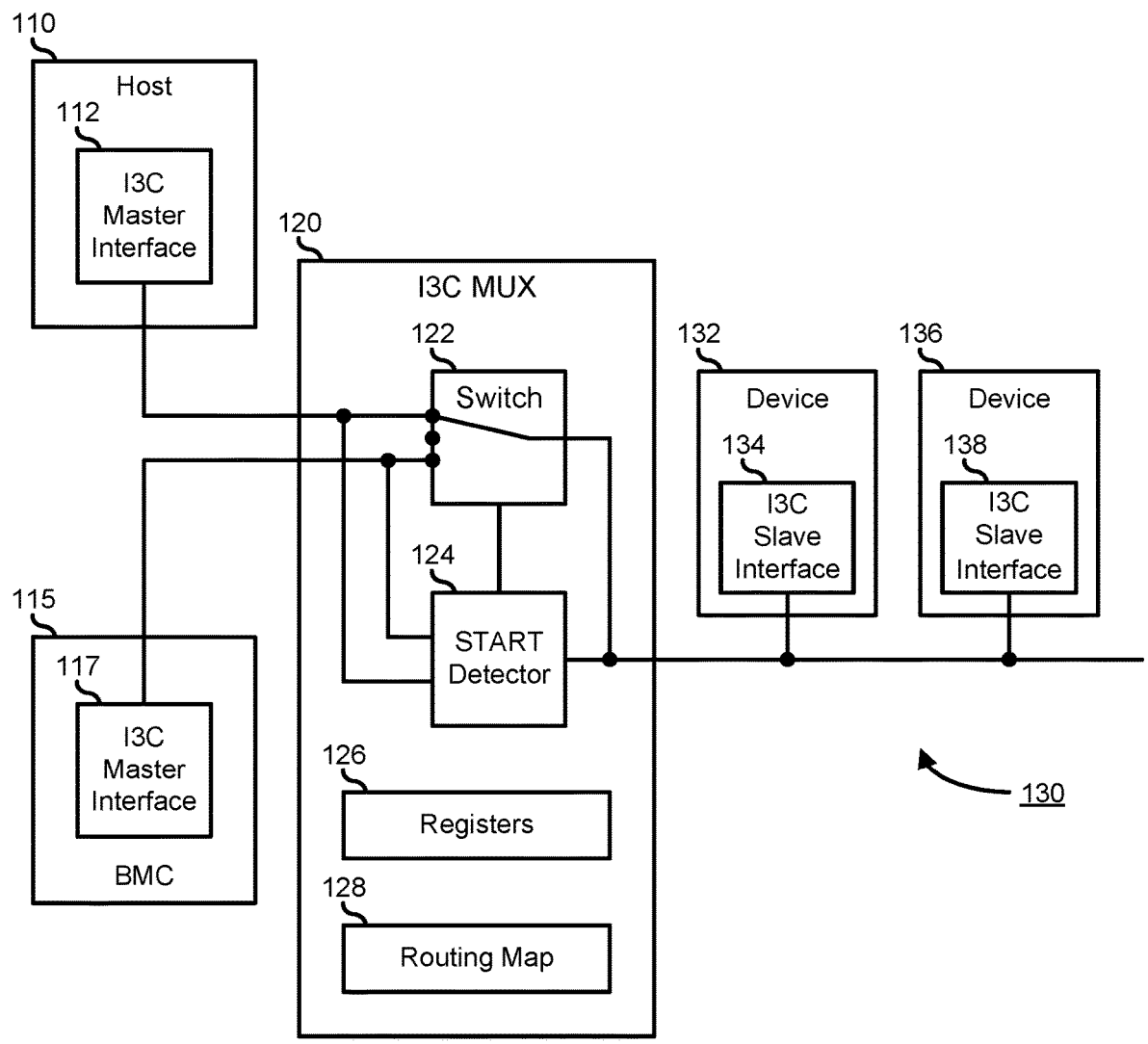
FIG. 1 is a block diagram illustrating an information handling system according to an embodiment of the present disclosure.

FIG. 1 illustrates an information handling system 100 including a host processing system 115 with an Improved Inter-Integrated Circuit (I3C) interface 117, a baseboard management controller (BMC) 115 with an I3C interface 117, a I3C multiplexor 120, and an I3C bus 130. I3C multiplexor 120 includes a switch 122, a START detector 124, control and data registers 126, and a routing map 128. I3C is a two-wire multidrop serial data interface standard provided by the Mobile Industry Processor Interface (MIPI) Alliance, and serves as an evolution of the Serial Peripheral Interface (SPI) and Inter-Integrated Circuit (I2C) interface for providing side-band management and control of devices on information handling systems.

Host processing system 115 represents the hardware, firmware, and software components that are typically associated with a computer or other information handing system, and that includes devices 132 and 136 as components for providing various processing tasks in response to the execution of machine-executable code by a processor of the information handling system. As such, host processing system 110 may be understood to be connected to devices 132 and 136 via one or more communication interface, such as a Peripheral Component Interconnect-Express (PCIe) interface, a memory interface, or another interface as needed or desired. Further, host processing system 110 may be understood to operate to manage or otherwise communicate with devices 132 and 136 via respective I3C slave interfaces 134 and 138.

For example, where device 132 represents a memory device, host processing system 100 may be connected to the device via a memory interface, not illustrated, to provide high-speed data transfers between the host processing system and the memory device. Continuing the example where device 132 is a memory device, the device may include a Serial Presence Detect (SPD) hub that includes I3C slave interface 134, and that is connectable to I3C master interface 112 via switch 122, when the switch is configured to connect the I3C master interface to I3C bus 130, as described further below. Here, host processing system 110 may need to access the SPD hub during a memory initialization phase of a system boot process for information handling system 100.

Information handing system 100 may further include a management system that includes BMC 115 and that represents one or more processing devices, such as a dedicated BMC System-on-a-Chip (SoC) device, one or more associated memory devices, one or more network interface devices, a complex programmable logic device (CPLD), and the like, that operate together to provide a management environment for the information handling system. As such, I3C master interface 117 is connected to I3C slave interfaces 134 and 138 via switch 122, when the switch is configured to connect the I3C master interface to I3C bus 130, as described further below, to provide an out-of-band (OOB) mechanism to retrieve information related to the operation of the devices and the host environment, to provide BIOS/UEFI or system firmware updates, to manage non-processing components of information handling system 100, such as system cooling fans and power supplies. Continuing the example where device 132 is a memory device that includes the SPD, BMC 115 may need to access the SPD hub to upgrade firmware associated with the memory device, or the like. An example of BMC 115 may include a commercially available BMC product or other device that operates in accordance with an Intelligent Platform Management Initiative (IPMI) specification, a Web Services Management (WS-MAN) interface, a Redfish or other Distributed Management Task Force (DMTF) standard, or another managed system standard, and can include one or more devices such as an Integrated Dell Remote Access Controller (iDRAC), an Embedded Controller (EC), or the like. Information handling system 100 may include additional memory devices, logic devices, security devices, or the like, as needed or desired.

The I3C interface provides several improvements over previous two-wire low-speed interfaces, such as SPI and I2C. In particular, I3C provides faster data rates to accommodate the larger number of I3C connected devices. For example, a typical DDR5 DIMM may include six or more I3C slave interfaces (one for a SPD hub, one for a Power Management Integrated Circuit (PMIC), one for a Register Control Device (RCD), three or more for temperature sensors, etc.), and a typical server system may include multiple processors that each support up to eight DIMMs on a memory channel, for a total of 48 or more I3C slave interfaces per memory channel, in addition to other I3C connected devices that are not associated with the memory channels. Additionally, the I3C interface supports dynamic addressing and address remapping that permits an information handling system to flexibly allocate resources for servicing the multiple I3C interfaces, without being tied to determining the allocation based upon prior fixed addressing schemes. Further, the I3C interface provides Common Command Codes (CCC) that permit for more unified management of the I3C connected devices.

Finally, the I3C interface provides for I3C slave devices to issue in-band interrupts (IBI) over the two-wire interface. Here, an I3C slave device can issue an IBI by one of two methods. In the first method, described herein as a "reactive IBI," after an I3C master device generates a START condition, the I3C slave interfaces on a common I3C bus can each transmit their I3C addresses onto a data line (SDA) of the I3C bus. In the second method, described herein as a "proactive IBI," an I3C slave device can issue a START condition by pulling the data line (SDA) line low. In response, the I3C master device clocks the clock line (SCL) and the I3C slave device drives its I3C address onto the data line (SDA). In either case, a data payload (Mandatory Data Byte (MDB)) can be provided with the I3C address.

In operation, only one of I3C master interfaces 112 and 117 will be active, that is, connected via switch 122 to I3C bus 130, at any particular time. As such, all of the IBIs initiated by I3C slave interfaces 134 and 138 will be provided to the I3C master interface 112 or 117 that is connected to I3C bus 130 via switch 122, regardless of whether or not the particular connected I3C master interface is the target of the IBI. Thus the connected I3C master interface 112 or 117 may be flooded with IBIs that the connected I3C master interface may not be configured to handle. Moreover, where I3C master interface 112 is the connected I3C master interface, the flood of IBIs may cause a performance degradation on information handling system 100 because IBIs are typically handled as a System Management Interrupt (SMI) which causes processors of the information handling system to halt normal processing operations while handling the SMI. Moreover, where an IBI is targeted to a non-connected I3C master interface, that I3C master may miss critical IBIs, causing performance degradations or possible damage to information handling system. For example, where an IBI is related to an overtemperature condition on one of devices 132 or 136, the failure of BMC 115 to receive that IBI may result in thermal damage to the particular device.

START detector 124 is connected to I3C bus 130 to detect the assertion of an IBI by either one of I3C slave interfaces 134 and 138. In particular, when one of I3C slave interfaces 134 or 138 pulls the data line (SDA) low, the connected I3C master interface 112 or 117 will response by clocking the clock line (SCL), and then the I3C slave interface will drive a particular string (here "7'h7E") onto the data line (SDA) to indicate that data associated with a CCC is forthcoming, or the I3C slave interface will drive its I3C address onto the data line (SDA) to indicate that the I3C slave interface is providing an IBI request. When the particular I3C slave interface 134 or 138 is providing an IBI request, START detector 124 stores the I3C address of the I3C slave interface that provided the IBI request.

START detector 124 then determines, based upon routing map 128 which one of I3C master interfaces 112 or 117 is the target of the IBI. In particular, routing map 128 provides information that correlates the I3C addresses of I3C slave interfaces 134 and 138 with an associated one of I3C master interfaces 112 and 117. If the I3C master interface that is associated with the I3C address of the I3C slave interface that issued the IBI is also the I3C master interface that is connected to I3C bus 130, then the IBI is handled by the associated I3C master interface in due course. However, if the I3C master interface that is associated with the I3C address of the I3C slave interface that issued the IBI is not the I3C master interface that is connected to I3C bus 130, then START detector 124 waits for the next STOP condition on from the connected I3C master interface 112 or 117, and then directs switch 122 to disconnect I3C bus 130 from both I3C master interfaces. Then START detector 124 operates as an I3C slave interface to the target of the MI, issuing the I3C address of the requesting I3C slave interface 133 or 138 to the target I3C master interface, and directs switch 122 to connect the target I3C master interface to I3C bus, and the IBI is handled by the target I3C master interface in due course.

In a particular embodiment, routing map 128 stores a simple routing of I3C slave interfaces 134 and 138 with only one of the I3C master interfaces 112 and 117. In this case, all interrupts from a particular device 132 or 136 will be handled by the associated one of I3C master interfaces 112 or 117. For devices 132 and 136 that are typically managed by one or the other of host processing system 110 and BMC 115, this embodiment provides for simple IBI handling by the I3C master interface 112 or 117 associated with the typical manager for each such device's IBIs. However, in this embodiment, IBIs that may be serviced by either one of host processing system 110 or BMC 115, depending upon the circumstances, such as where one of the I3C slave interfaces is associated with a SPD hub, the handling of the IBIs based upon routing table 128 may necessitate further procedures within an interrupt handler of the host processing system or the BMC. For example, if IBIs from a SPD hub are routed by routing table 128 to I3C master interface 117, then the interrupt handler of BMC 115 may operate to determine if the SPD hub is issuing an IBI during a memory initialization phase of a system boot process for information handling system 100. If so, the interrupt handler of BMC 115 may operate to provide data from the SPD hub to host processing system 110.

In yet another embodiment, where a particular I3C slave interface operates to issue a first type of IBI that is normally handled by host processing system 110, and a second type of IBI that is normally handled by BMC 115, then START detector 124 further operates to determine which type of IBI is being issued. Here, routing table 128 does not include single mappings for each I3C slave interface, but may include multiple mappings based upon the type of IBI being issued.

In a particular embodiment, routing table 128 is preloaded with entries based upon the design of information handling system 100. For example, routing table 128 may be implemented in a non-volatile memory of I3C multiplexor 120 that is programmed at a factory where information handling system 100 is manufactured, based upon fixed notions of which one of host processing system 110 or BMC 115 are best selected to handle the various IBIs. In another embodiment, routing table 128 is programmable, such that one of host processing system 110 or BMC 115 may write or rewrite the mapping included in routing table 128, as needed or desired.

In a particular embodiment, one of I3C master interfaces 112 or 117 may need to maintain control of I3C bus 130. Here, the particular I3C master interface 112 or 117 operates to write an override to registers 128 which operates to disable START detector 124 from intercepting and rerouting Mb based upon routing map 128. Then, when the override setting is set, I3C multiplexor 120 operates as a simple multiplexor, switching connections to I3C bus 130 between I3C master interfaces 112 and 117 based upon received commands from the I3C master interfaces.

Figure 2:
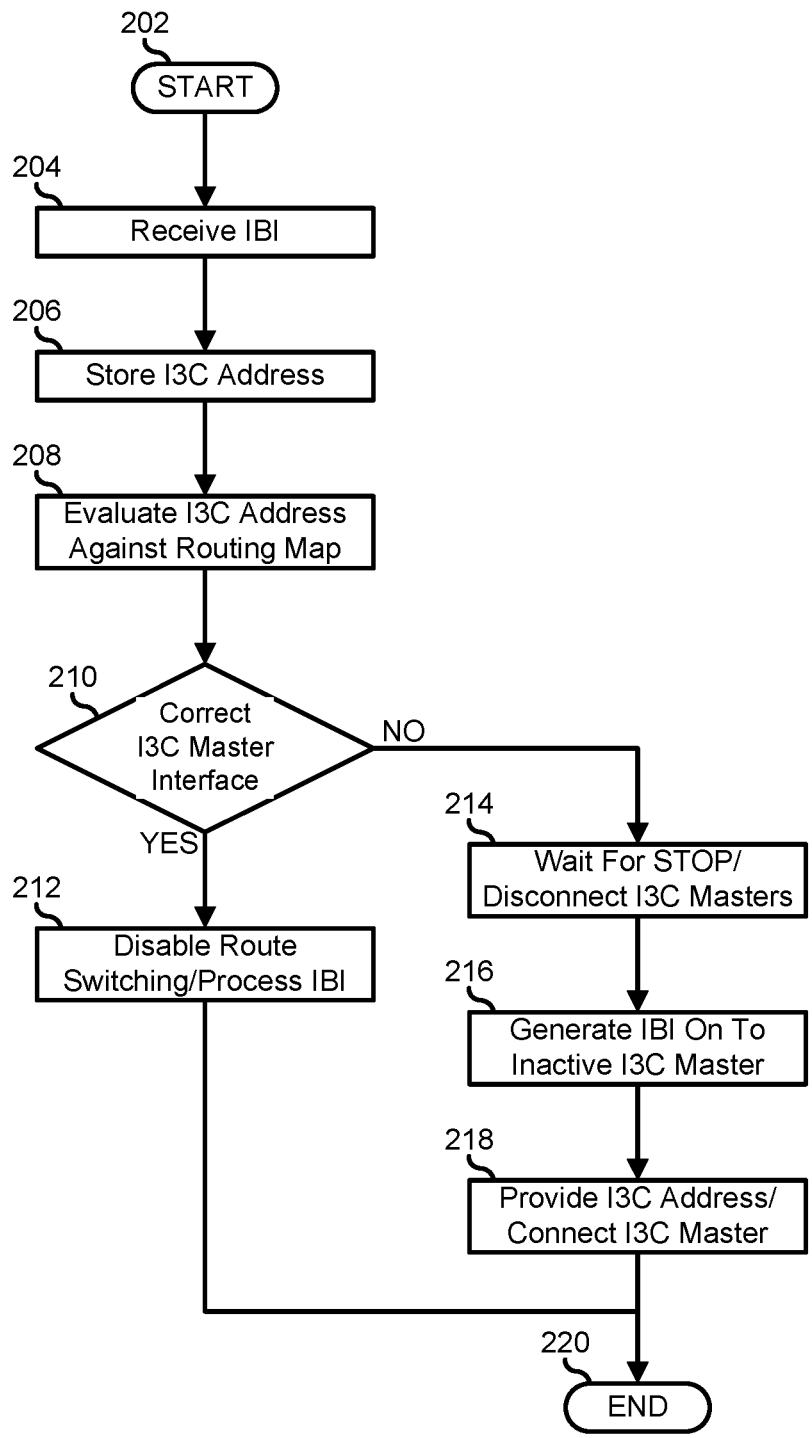
FIG. 2 is a flowchart illustrating a method for handling in-band interrupts with multiple I3C master interfaces in an information handling system according to an embodiment of the present disclosure.

FIG. 2 illustrates a method for handling in-band interrupts with multiple I3C master interfaces in an information handling system starting at block 202. An I3C multiplexor receives an IBI from a I3C slave interface in block 204, and stores the I3C address of the I3C slave interface that generated the IBI in block 206. The I3C address of the I3C slave interface that generated the IBI is evaluated against a routing table in block 208, and a decision is made as to whether or not the I3C master interface that is the target of the IBI is currently connected to the I3C slave interface that generated the IBI in decision block 210. If so, the "YES" branch of decision block 210 is taken, route switching by the I3C multiplexor is disabled and the IBI is processed by the connected I3C master in block 212 and the method ends in block 220.

If the I3C master interface that is the target of the IBI is not currently connected to the I3C slave interface that generated the IBI, the "NO" branch of decision block 210 is taken, and the I3C multiplexor waits for a next STOP state on the I3C bus before disconnecting all I3C master interfaces from the I3C bus in block 214. The I3C multiplexor generates an IBI to the I3C master interface that is the target of the original IBI in block 216. When the I3C master interface that is the target of the original IBI responds to the IBI, the I3C multiplexor provides the I3C address of the I3C slave interface that generated the original IBI and connects the I3C master interface to the I3C bus in block 218, and the method ends in block 220.

Figure 3:
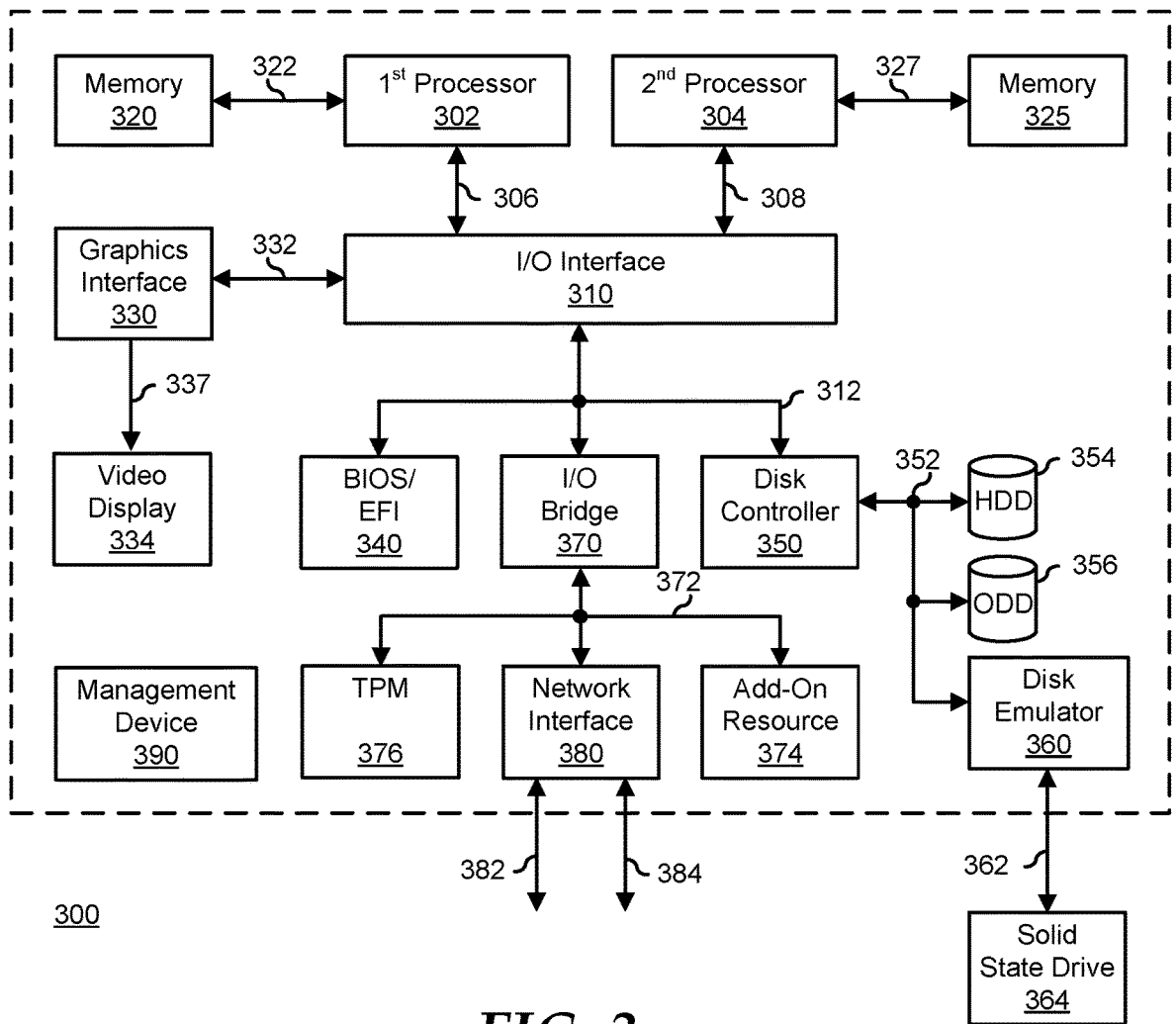
FIG. 3 is a block diagram illustrating a generalized information handling system according to another embodiment of the present disclosure.

FIG. 3 illustrates a generalized embodiment of an information handling system 300 similar to information handling system 100. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A multiplexor for an Improved Inter-Integrated Circuit (I3C) network, the multiplexor comprising:
    a switch to couple a plurality of I3C slave interfaces to a selectable one of a plurality of I3C master interfaces, wherein each I3C slave interface is identified by an associated I3C address;
    a routing map including a plurality of map entries, wherein each I3C slave interface is associated with at least one map entry, and each map entry maps the associated I3C slave interface with one of the I3C master interfaces based upon the I3C address of the I3C slave interface, such that for each map entry, an In-Band Interrupt (MI) received from the associated I3C slave interface is mapped to the associated I3C master interface; and
    an interrupt detector configured to detect a first IBI from a first one of the I3C slave interfaces, determine that a first map entry associated with the first I3C slave interface maps the first I3C slave interface with a first one of the I3C master interfaces based upon the first IBI, and direct the switch to couple the first I3C slave interface to the first I3C master interface based upon the first map entry.

2. The multiplexor of claim 1, wherein when the switch couples the first I3C slave interface to the first I3C master interface when the first IBI is detected, the interrupt detector is further configured to direct the switch to retain the coupling of the first I3C slave interface to the first I3C master interface.

3. The multiplexor of claim 1, wherein when the switch couples the first I3C slave interface to a second one of the I3C master interfaces when the first IBI is detected, the interrupt detector is further configured to store a first I3C address associated with the first I3C slave interface.

4. The multiplexor of claim 3, wherein when the switch couples the first I3C slave interface to the second I3C master interface when the first IBI is detected, the interrupt detector is further configured to direct the switch to decouple the first I3C slave interface from the second I3C master interface.

5. The multiplexor of claim 4, wherein the interrupt detector is further configured to retrieve the first I3C address, and issue a second IBI to the first I3C master interface, wherein the second IBI includes the first I3C address.

6. The multiplexor of claim 5, wherein directing the switch to couple the first I3C slave interface to the first I3C master interface is in response to issuing the second IBI.

7. The multiplexor of claim 1, wherein the interrupt detector is further configured to detect a second IBI from the first I3C slave interfaces, determine that a second map entry associated with the first I3C slave interface maps the first I3C slave interface with a second one of the I3C master interfaces based upon the second IBI, and direct the switch to couple the first I3C slave interface to the second I3C master interface based upon the second map entry.

8. The multiplexor of claim 7, wherein the interrupt detector is further configured to determine that the first IBI is associated with the first map entry based upon a first context of an information handling system, and determine that the second IBI is associated with the second map entry based upon a second context of the information handing system.

9. The multiplexor of claim 8, wherein the first context is associated with a system boot process of the information handling system, and the second context is associated with a run time process of the information handling system.

10. The multiplexor of claim 7, wherein the interrupt detector is further configured to determine that the first IBI is associated with the first map entry based upon the first IBI being associated with a first function of the first I3C slave interface, and determine that the second IBI is associated with the second map entry based upon the second IBI being associated with a second function of the first I3C slave interface.

11. A method for switching an Improved Inter-Integrated Circuit (I3C) network, the method comprising:
    detecting, by an interrupt detector of an I3C multiplexor, a first In-Band Interrupt from a first one of a plurality of I3C slave interfaces;
    determining that a first map entry of a plurality of map entries in a routing map of the I3C multiplexor maps the first I3C slave interface with a first one of a plurality of I3C master interface based upon the first IBI; and
    directing a switch of the I3C multiplexor to couple the first I3C slave interface to the first I3C master interface based upon the first map entry, wherein the switch is configured to couple the I3C slave interfaces to a selectable one of the I3C master interfaces.

12. The method of claim 11, wherein when the switch couples the first I3C slave interface to the first I3C master interface when the first IBI is detected, the method further comprising:
    directing the switch to retain the coupling of the first I3C slave interface to the first I3C master interface.

13. The method of claim 11, wherein when the switch couples the first I3C slave interface to a second one of the I3C master interfaces when the first IBI is detected, the method further comprises:
    storing a first I3C address associated with the first I3C slave interface.

14. The method of claim 13, wherein when the switch couples the first I3C slave interface to the second I3C master interface when the first IBI is detected, the method further comprises:
    directing the switch to decouple the first I3C slave interface from the second I3C master interface.

15. The method of claim 14, further comprising:
    retrieving the first I3C address; and
    issuing a second IBI to the first I3C master interface, wherein the second IBI includes the first I3C address.

16. The method of claim 15, wherein directing the switch to couple the first I3C slave interface to the first I3C master interface is in response to issuing the second IBI.

17. The method of claim 11, further comprising:
    detecting a second IBI from the first I3C slave interfaces;
    determining that a second map entry associated with the first I3C slave interface maps the first I3C slave interface with a second one of the I3C master interfaces based upon the second IBI; and directing the switch to couple the first I3C slave interface to the second I3C master interface based upon the second map entry.

18. The method of claim 17, further comprising:

determining that the first IBI is associated with the first map entry based upon a first context of an information handling system; and determining that the second IBI is associated with the second map entry based upon a second context of the information handing system, wherein the first context is associated with a system boot process of the information handling system, and the second context is associated with a run time process of the information handling system.

19. The method of claim 17, further comprising:

determining that the first IBI is associated with the first map entry based upon the first IBI being associated with a first function of the first I3C slave interface; and determining that the second IBI is associated with the second map entry based upon the second IBI being associated with a second function of the first I3C slave interface.

20. An information handling system, comprising:

a plurality of Improved Inter-Integrated Circuit (I3C) slave interfaces;

a plurality of I3C master interfaces; and a multiplexor including:

a switch to couple the I3C slave interfaces to a selectable one of the I3C master interfaces, wherein each I3C slave interface is identified by an associated I3C address;

a routing map including a plurality of map entries, wherein each I3C slave interface is associated with at least one map entry, and each map entry maps the associated I3C slave interface to one of the I3C master interfaces based upon the I3C address of the I3C slave interface, such that for each map entry, an In-Band Interrupt (MI) received from the associated I3C slave interface is mapped to the associated I3C master interface; and an interrupt detector configured to detect a first IBI from a first one of the I3C slave interfaces, determine that a first map entry associated with the first I3C slave interface maps the first I3C slave interface to a first one of the I3C master interfaces based upon the first IBI, and direct the switch to couple the first I3C slave interface to the first I3C master interface based upon the first map entry.

* * * * *

UNITED STATES PATENT AND TRADEMARK OFFICE
CERTIFICATE OF CORRECTION

PATENT NO. : 10,990,545 B1  
APPLICATION NO. : 16/836620  
DATED : April 27, 2021  
INVENTOR(S) : Timothy M. Lambert et al.

Page 1 of 1

It is certified that error appears in the above-identified patent and that said Letters Patent is hereby corrected as shown below:

Column 9, Line 27: Claim 1, Please change "Interrupt (MI) received" to --Interrupt (IBI) received--

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*